(12) United States Patent
Deraz et al.

(10) Patent No.: US 10,862,979 B2
(45) Date of Patent: Dec. 8, 2020

(54) TECHNIQUES FOR SUPPORTING REMOTE MICRO-SERVICES AS NATIVE FUNCTIONS IN SPREADSHEET APPLICATIONS

(71) Applicant: Microsoft Technology Licensing, LLC, Redmond, WA (US)

(72) Inventors: Ehab Sobhy Deraz, Bellevue, WA (US); Carlos Augusto Otero, Seattle, WA (US); Annie Colonna, Seattle, WA (US); Christopher John Gross, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 15/481,998

(22) Filed: Apr. 7, 2017

(65) Prior Publication Data
US 2018/0295194 A1   Oct. 11, 2018

(51) Int. Cl.
| | | |
|---|---|---|
| *G06F 17/00* | (2019.01) | |
| *H04L 29/08* | (2006.01) | |
| *G06Q 10/10* | (2012.01) | |
| *G06F 40/18* | (2020.01) | |
| *G06F 16/21* | (2019.01) | |

(52) U.S. Cl.
CPC ............. *H04L 67/16* (2013.01); *G06F 40/18* (2020.01); *G06Q 10/10* (2013.01); *G06F 16/211* (2019.01); *H04L 67/10* (2013.01)

(58) Field of Classification Search
CPC . G06Q 10/06393; G06F 17/246; G06F 40/18; H04L 67/16
USPC ................................................ 715/212, 200
See application file for complete search history.

(56) References Cited

U.S. PATENT DOCUMENTS

| | | |
|---|---|---|
| 7,080,078 B1 | 7/2006 | Slaughter et al. |
| 8,151,116 B2 | 4/2012 | Van der Horst et al. |
| 8,914,516 B2 | 12/2014 | Warren et al. |
| 2008/0148240 A1 | 6/2008 | Jones et al. |

(Continued)

FOREIGN PATENT DOCUMENTS

TW         201612831 A        4/2016

OTHER PUBLICATIONS

Shiohara Keiichi, A Concept of Extending Spreadsheet Cell Functions for Web Application Development Based on a Cloud Platform, Published 2014 by IEEE Workshop, pp. 1362-1365.*

(Continued)

*Primary Examiner* — Manglesh M Patel

(57) ABSTRACT

The techniques described herein facilitate supporting remote micro-services from cloud-based analytics platforms as native functions in spreadsheet applications, e.g., Microsoft Excel®. In an implementation, a method of supporting remote micro-services as native functions in a spreadsheet application is disclosed. The method includes accessing a listing identifying at least one micro-service that is available for use by a user of a spreadsheet application. The at least one micro-service is remotely located in a cloud service platform. The method further includes obtaining a schema associated with the at least one remote micro-service, generating a translation model based on the schema, and registering the skeleton spreadsheet function as a native function in the spreadsheet application. The translation model maps between the at least one remote micro-service and a skeleton spreadsheet function.

20 Claims, 10 Drawing Sheets

(56) References Cited

U.S. PATENT DOCUMENTS

| | | | |
|---|---|---|---|
| 2011/0016379 | A1 | 1/2011 | Mccoll et al. |
| 2011/0185305 | A1 | 7/2011 | Lai et al. |
| 2012/0151314 | A1 | 6/2012 | Campbell et al. |
| 2012/0330995 | A1 | 12/2012 | Muenkel |
| 2013/0124957 | A1 | 5/2013 | Oppenheimer et al. |
| 2013/0132856 | A1* | 5/2013 | Binyamin ............... G06F 3/017 715/740 |
| 2013/0185362 | A1 | 7/2013 | Clagg et al. |
| 2013/0246513 | A1* | 9/2013 | Zaveri .................... G06F 3/067 709/203 |
| 2013/0246932 | A1* | 9/2013 | Zaveri .................... G06F 3/017 715/740 |
| 2014/0032759 | A1 | 1/2014 | Barton et al. |
| 2014/0136937 | A1 | 5/2014 | Patel et al. |
| 2014/0245253 | A1 | 8/2014 | Goldfeder |
| 2014/0280861 | A1 | 9/2014 | Anderson et al. |
| 2014/0317640 | A1* | 10/2014 | Harm .................... G06F 9/4843 719/320 |
| 2015/0121462 | A1 | 4/2015 | Courage et al. |
| 2015/0227726 | A1 | 8/2015 | Grigg et al. |
| 2015/0286655 | A1 | 10/2015 | von haden et al. |
| 2015/0331841 | A1 | 11/2015 | Antebi et al. |
| 2015/0339328 | A1 | 11/2015 | Namini |
| 2015/0347372 | A1 | 12/2015 | Waldman et al. |
| 2016/0085738 | A1 | 3/2016 | Briggs |
| 2016/0085962 | A1 | 3/2016 | Sokolov et al. |
| 2016/0154780 | A1 | 6/2016 | Otero et al. |
| 2017/0302653 | A1 | 10/2017 | Ortner et al. |
| 2018/0276060 | A1* | 9/2018 | Arumugam ............. G06F 9/547 |
| 2018/0295118 | A1 | 10/2018 | Otero et al. |

OTHER PUBLICATIONS

"Oracle Fusion Financials", https://web-beta.archive.org/web/20101011123411/http:/www.oracle.com/us/products/applications/fusion/fusion-finance-solution-brief-173012.pdf, Published on: Oct. 11, 2010, 2 pages.

"Extend upsell potential with cloud-based spreadsheet functionality", http://oxpp.net/wp-content/uploads/2014/07/OX_Spreadsheet_Datasheet.pdf, Published on: Jul. 2014, 2 pages.

Pendolino, Mark, "Smartsheet Blog", https://www.smartsheet.com/blog/smartsheet-tips-working-offline, Published on: Nov. 26, 2014, 19 pages.

"Final Office Action Issued in U.S. Appl. No. 15/481,865", dated Apr. 11, 2019, 10 Pages.

"Non Final Office Action issued in U.S. Appl. No. 15/481,865", dated Nov. 28, 2018, 20 Pages.

"Access Token—Wikipedia, the Free Encyclopedia", Retrieved From: https://en.wikipedia.org/w/index.php?title=Access%20token&oldid=605535962, Retrieved On: Apr. 25, 2016, 3 Pages.

"Work With Worksheet Data In Onedrive", Retrieved From: https://support.office.com/en-ie/article/work-with-worksheet-data-in-onedrive-c051a205-1c06-4feb-94d8-793b0126b53a, Retrieved on: Dec. 19, 2016, 5 Pages.

Patankar, Vinay, "Microsoft Excel vs. Google Sheets: The Spreadsheet Showdown", Retrieved From: https://www.process.st/microsoft-excel-vs-google-sheets/, Jun. 9, 2016, 10 Pages.

"International Search Report and Written Opinion Issued in PCT Application No. PCT/US2018/024985", dated Jun. 7, 2018, 12 Pages.

"Non Final Office Action Issued in U.S. Appl. No. 15/481,865", dated Dec. 11, 2019, 11 Pages.

\* cited by examiner

TECHNIQUES FOR SUPPORTING REMOTE MICRO-SERVICES AS NATIVE FUNCTIONS IN SPREADSHEET APPLICATIONS

CROSS-REFERENCE TO RELATED APPLICATIONS

This application is related to co-pending U.S. patent application Ser. No. 15/481,865, entitled "CREDENTIAL-BASED PROACTIVE DISCOVERY OF REMOTE MICRO-SERVICES BY SPREADSHEET APPLICATIONS," which was filed on the same day as this application, the contents of which are expressly incorporated by reference herein.

BACKGROUND

Spreadsheet applications such as, for example, Microsoft Excel®, are widely used in many fields and are increasingly important for analyzing data in today's business and computing environments. For example, data analysts predominately use client-side spreadsheet applications as tools for performing spreadsheet tasks including, but not limited to, consolidating and massaging data, producing charts, performing complex calculations, and the like. Likewise, data science teams regularly utilize remote analytics platforms (or cloud services) such as, for example, Azure® Machine Learning (AzureML), to generate and execute data science models. For example, data science teams regularly develop data science models comprising various micro-services, e.g., web services or algorithms, that are accessible and executable via the remote analytics platforms.

Unfortunately, these micro-services are not readily available or discoverable by data analysts seeking to benefit from the work of the data science teams. Moreover, even if the micro-services are discoverable, making the micro-services available can be exceedingly difficult as each individual micro-service must be individually ported (or re-coded) as a native spreadsheet function or otherwise manually connected to the spreadsheet via copy and pasting of uniform resource locators (URLs), application program API keys, etc.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to supporting remote micro-services from cloud-based analytics platforms as native functions in spreadsheet applications, e.g., Microsoft Excel®. In an implementation, a method of supporting remote micro-services as native functions in a spreadsheet application is disclosed. The method includes accessing a listing identifying at least one micro-service that is available for use by a user of a spreadsheet application based on credential information. The at least one micro-service is remotely located in a cloud service platform. The method further includes obtaining a schema associated with the at least one remote micro-service, generating a translation model based on the schema, and registering the skeleton spreadsheet function as a native function in the spreadsheet application. The translation model maps between the at least one remote micro-service and a skeleton spreadsheet function.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1:
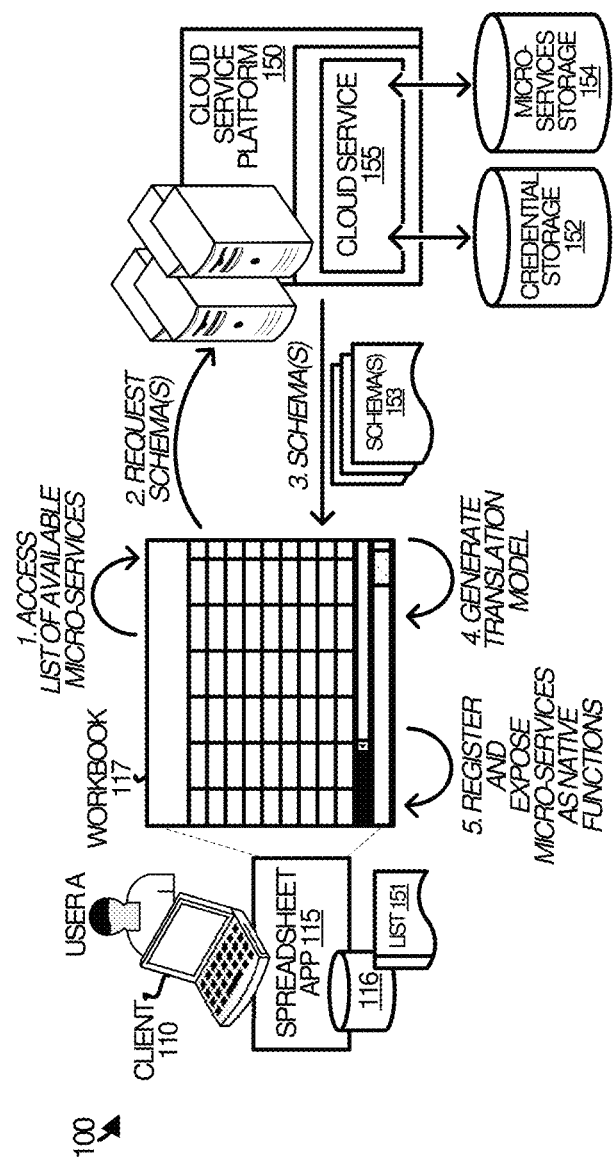
FIG. 1 depicts a block diagram illustrating an example operational architecture for supporting remote micro-services as native functions in spreadsheet applications, according to some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Various embodiments of the present technology generally relate to supporting remote micro-services as native functions in spreadsheet applications. More specifically, the technology describes spreadsheet applications that can expose remote functions, e.g., micro-services, from a remote analytics platform (or cloud service), e.g., Azure Machine Learning, in such a way that the users of the spreadsheet applications are not aware that the remote functionalities are not native to the client spreadsheet application. The remote analytics platform can be any micro-service generating platform.

In some embodiments, a spreadsheet application, e.g., Microsoft Excel® spreadsheet application client, supports micro-services of a remotely located cloud service platform as native functions within the client. For example, the spreadsheet application initially accesses a listing identifying at least one remote micro-service available to a user of the spreadsheet application. The spreadsheet application obtains a schema associated with the at least one remote micro-service and generates a translation model based on the schema. As discussed herein, the schema includes a description of the at least one remote micro-service. The spreadsheet application then generates a translation model based on the schema. As discussed herein, the translation model maps between a skeleton spreadsheet function and the at least one remote micro-service. Once the model is generated, the spreadsheet application registers the skeleton spreadsheet function and exposes the skeleton spreadsheet function as a native function.

At least one technical effect enabled by the techniques discussed herein is the ability to seamlessly share work between multi-disciplinary teams. More specifically, the techniques described herein resolve issues of the prior art by bridging the gap between data scientists and analysts and, more specifically, by facilitating local support and exposure of remote micro-services or algorithms as native functions. Additionally, many advanced data science environments, e.g., R, Python, etc., require that a local runtime be installed on a client. The techniques discussed herein leverage a cloud runtime which avoids the need to install the local runtime and, thus, further enhances the ease with which the gap between data scientists and analysts can be bridged.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to supporting microservices as native functions in spreadsheet applications, embodiments of the present technology are equally applicable to various other applications such as locating equipment.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 depicts a block diagram illustrating an example operational architecture 100 for supporting remote microservices as native functions in spreadsheet applications, according to some embodiments. The example operational architecture 100 includes a client device 110 and a cloud service platform 150. The cloud service platform 150 includes a credential storage 152 and micro-services storage 154. The cloud service platform 150 executes cloud service 155.

Figure 10:
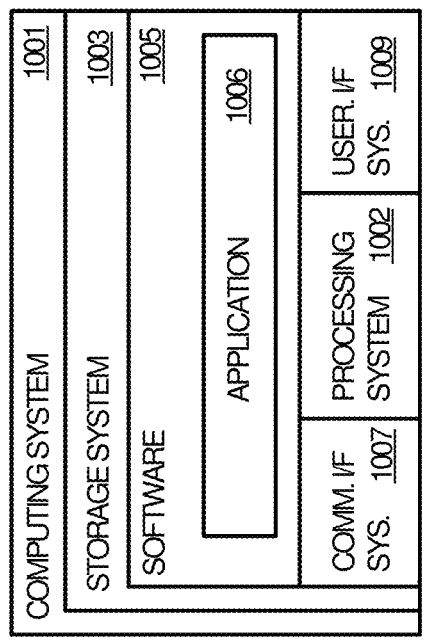
FIG. 10 is a block diagram illustrating an example computing system suitable for implementing the technology disclosed herein, including any of the applications, architectures, elements, processes, and operational scenarios and sequences illustrated in the Figures and discussed below in the Technical Disclosure.

As shown in the example of FIG. 1, workbook 117 is opened on client device 110 with spreadsheet application 115. The spreadsheet application 115 can include functionality including GUIs (graphical user interface) running on client device 110, e.g., a PC, mobile phone device, a Web server, or other application servers. Such systems may employ one or more virtual machines, containers, or any other type of virtual computing resource in the context of supporting remote micro-services as native functions within the spreadsheet application 115 of which the computing system 1001 of FIG. 10 is representative. The spreadsheet application 115 includes storage container 116. Storage container 116 includes a list 151 of micro-services that are available to a user e.g., user A, of the spreadsheet application 115. An example illustrating how the listing can be obtained from a cloud service platform 150 is shown and discussed in greater detail with reference to FIG. 6.

In operation, the spreadsheet application 115, initially accesses list 151 (step 1). As discussed herein, the list 151 identifies one or more remote micro-services, e.g., web services or algorithms, that are available to the user of a spreadsheet application 115. The one or more remote micro-services (and/or data associated with the micro-services) are located within cloud service platform 150 and, more specifically, persisted in micro-services storage 154.

Cloud service platform 150 is representative of any cloud service 155 or collection of services that is configured to facilitate generation and execution of micro-services, e.g., web services or algorithms, that are accessed and executable via the cloud service platform 150. For example, the cloud service platform 150 can be a remote analytics platform such as, for example, Azure® Machine Learning (AzureML), that facilitates generation, access and execution of micro-services. Other remote platforms are also possible. In operation, users of the cloud service platform 150, e.g., members of data science teams, can use the cloud service platform 150 to develop, access and execute micro-services. As discussed in more detail with reference to FIG. 6, the micro-services have associated access rights. The access rights are stored in credential storage 152. The access rights are assigned to the micro-services by, for example, members of a data science team and allow the members to provide access to other members of their teams, e.g., other data scientists, as well as other users on different teams, e.g., data analysts. A data analyst, e.g., user A, operating spreadsheet application 115 can then request and subsequently access the list 151.

The cloud service platform 150 may include server computers, blade servers, rack servers, and any other type of computing system (or collection thereof) suitable for carrying out a service or collection of services and for interfacing with the users of the service. The cloud service platform 150 can include GUIs (graphical user interface) running on a PC, mobile phone device, a Web server, or even other application servers. Such systems may employ one or more virtual machines, containers, or any other type of virtual computing resource in the context of supporting a service or collection of services, e.g., an analytics platform, of which the computing system 1001 of FIG. 8 is representative.

The spreadsheet application 115 processes the list 151 to identify available micro-services and requests a corresponding schema from the cloud service platform 150 for each micro-service (step 2). For example, list 151 can include each available micro-service and an address for accessing a description of the micro-service from the cloud service platform 150. The cloud service platform 150 (executing cloud service 155) receives the requests and provides the spreadsheet application 115 with the schemas 153 (step 3). As discussed herein, each schema 153 includes a description of the corresponding micro-service. For example, the description of the schema can include information about input and output parameters, data types, etc., of the micro-service. In some embodiments, the schema (or description of the micro-service) comprises a swagger document.

Once the schemas 153 are received, the spreadsheet application 115 generates a translation model for each available micro-service based on the corresponding schema (step 4). As discussed herein, each translation model maps between a spreadsheet function and a corresponding remote micro-service. In some embodiments, a new spreadsheet function (or skeleton spreadsheet function) is created for each available micro-service.

Lastly, the spreadsheet application 115 registers the new spreadsheet functions (or skeleton spreadsheet functions) and exposes the functions to the user as native functions of spreadsheet application 115. As discussed herein, the client device 110 can be any device and, thus, a user can now run or execute sophisticated models, e.g., machine learning models on devices without concern for computing power, e.g., via Excel® on an iPhone.

The new spreadsheet functions (or skeleton spreadsheet functions) can be exposed to the user, e.g., user A, from various entry points. For example, the new spreadsheet functions (or skeleton spreadsheet functions) can be exposed to the user via user interface (UI) entry points including, but not limited to, through auto-complete functionality, through sub-portions of the spreadsheet UI such as, for example, via a ribbon, or by way of an insert function dialogue of the spreadsheet application. Various example UIs for exposing the new spreadsheet functions (or skeleton spreadsheet functions) are shown and discussed in greater detail with reference to FIGS. 7-9.

Figure 2:
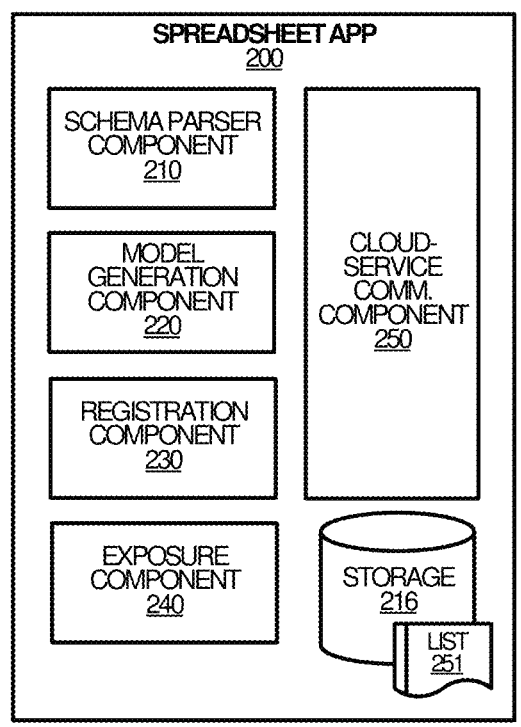
FIG. 2 depicts example components of a spreadsheet application, according to some embodiments.

FIG. 2 depicts example components of a spreadsheet application 200, according to some embodiments. The spreadsheet application 200 can be spreadsheet application 115 of FIG. 1, although alternative configurations are possible. The functions represented by the components, modules and/or engines described with reference to FIG. 2 can be implemented individually or in any combination thereof, partially or wholly, in hardware, software, or a combination of hardware and software.

As illustrated in the example of FIG. 2, the spreadsheet application 200 includes a schema parser component 210, a model generation component 220, a registration component 230, an exposure component 240, a cloud-service communication component 250, and a storage container 216 that includes list 251. List 251 identifies micro-services that are available to a user of spreadsheet application 200 based on credential information, e.g., user credentials or some other credential information. List 251 may be list 151 of FIG. 1, although alternative configurations are possible. Other systems, databases, and/or components are also possible. Some or all of the components can be omitted in some embodiments.

The schema parser component 210 accesses list 251 from storage container 216 and processes the listing to identify micro-services available to the user of the spreadsheet application. Once identified, the schema parser component 210 directs the cloud-service communication component 250 to obtain schemas associated with the micro-services from a cloud service, e.g., cloud service 155. As discussed herein, obtaining the schemas can include requesting the schemas for each of the one or more micro-services from the could service. The cloud service can return the schemas individually or as a bundle. Once the schemas are obtained, the schema parser component 210 parses the schemas to identify relevant information such as input and output parameters associated with each micro-service and passes the information to the model generation component. As discussed herein, identifying input and output parameters can include determining data types associated with the input and output parameters.

The model generation component 220 generates a translation model based on the schemas and, more particularly, based on the parsed schema data including the relevant information parsed from the schemas such as the input and output parameters associated with each micro-service and the corresponding data types. In some embodiments, generating a translation model associated with a remote micro-service can include generating a skeleton spreadsheet function corresponding to the micro-service.

The registration component 230 registers the skeleton spreadsheet functions as native functions in the spreadsheet application. The registration process can include providing the spreadsheet application with information about the function including the name of the function, inputs and outputs of the function, and/or descriptions of the function.

The exposure component 240 exposes the skeleton spreadsheet functions through a user interface as native functions of the spreadsheet application. In some embodiments, the exposure component 240 can render and/or enable the rendering of the skeleton spreadsheet functions. As discussed herein, exposing the skeleton spreadsheet functions to the user can include presenting the one or more micro-services to the user through the user interface at an entry point which can be can be, among other entry points, autocomplete functions, ribbons, or via insert functionality.

The cloud-service communication component 250 communicates with the cloud service, e.g., cloud service 155. As discussed above, the communications can include requesting schemas associated with micro-services available to a user of the spreadsheet application. Additionally, the cloud-service communication component 250 can transmit calls to the micro-services constructed as a result of requests to execute skeleton spreadsheet functions.

Figure 3:
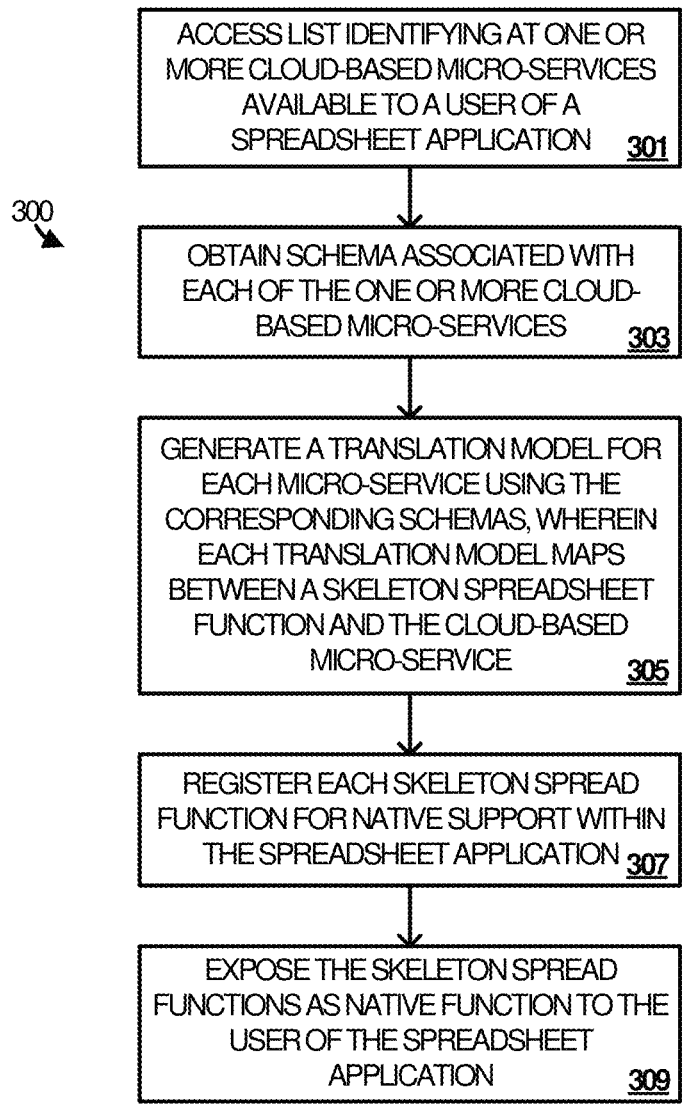
FIG. 3 depicts a flow diagram illustrating example operations of a spreadsheet application for exposing remote micro-services as native functions, according to some embodiments.

FIG. 3 depicts a flow diagram illustrating example operations 300 of a spreadsheet application for exposing remote micro-services as native functions, according to some embodiments. The example operations 300 may be performed in various embodiments by a spreadsheet application such as, for example, spreadsheet application 115 of FIG. 1, or one or more processors, extensions, modules, engines, components or tools associated therewith.

To begin, at 301, the spreadsheet application accesses a list identifying one or more remote micro-services, e.g., list 151 of FIG. 1 or 251 of FIG. 2. As discussed herein, the remote micro-services are remotely located in a cloud service platform, e.g., cloud service platform 150 of FIG. 1. In some embodiments, the listing can identify the one or more remote micro-services and an address for accessing a schema associated with each of the micro-services in the cloud service platform or, more particularly, within micro-services storage container in the cloud service platform.

At 303, the spreadsheet application obtains a schema for each of the one or more remote micro-services. As discussed herein, each schema includes a description of a corresponding remote micro-service. In some embodiments, obtaining the schema includes generating a request for the schema, sending the request for delivery to the cloud service platform, and receiving the schema from the cloud service platform responsive to sending the request. As discussed herein, a schema can identify input and output parameters and data types associated with a remote micro-service. In some embodiments, the schema is contained in a swagger document or some other document that is readable or otherwise decipherable by the spreadsheet application.

At 305, the spreadsheet application generates a translation model for each of the one or more remote micro-services based on the corresponding schema. As discussed herein, each translation model maps between a skeleton spreadsheet function and one of the one or more remote micro-services. An example illustrating translation model generation or creation is shown and discussed in greater detail with reference to FIG. 4.

At 307, the spreadsheet application registers each skeleton spreadsheet function for native support within the spreadsheet application. As discussed herein, once registered, the skeleton spreadsheet functions appear as native functions to the user of the spreadsheet application.

Lastly, at 309, the spreadsheet application exposes the skeleton spreadsheet function to the user of the spreadsheet as native functions. As discussed above, the skeleton spreadsheet functions can be exposed to the user, e.g., user A, from various UI entry points including, but not limited to, through auto-complete functionality, through sub-portions of the spreadsheet UI such as, for example, via a ribbon, or by way of an insert function dialogue of the spreadsheet application. Various example UIs for exposing the new spreadsheet functions (or skeleton spreadsheet functions) are shown and discussed in greater detail with reference to FIGS. 7-9.

Figure 4:
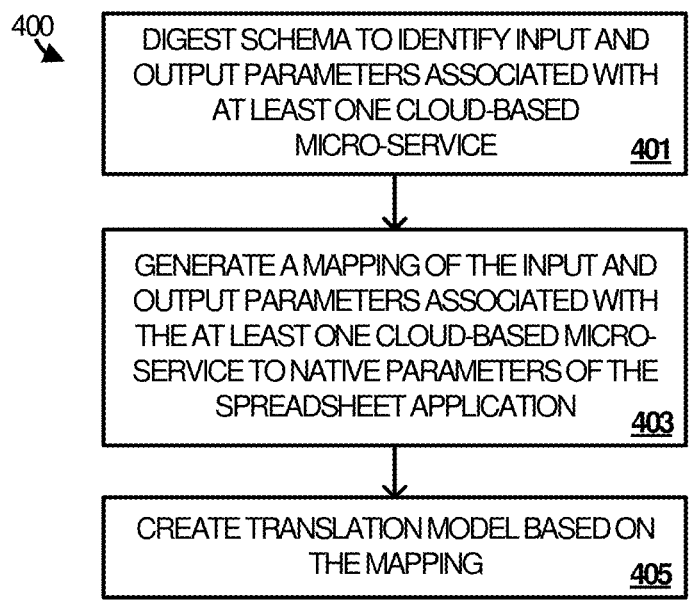
FIG. 4 depicts a flow diagram illustrating example operations of a spreadsheet application for creating a translation model for a corresponding remote micro-service, according to some embodiments.

FIG. 4 depicts a flow diagram illustrating example operations 400 of a spreadsheet application for creating a translation model for a corresponding remote micro-service, according to some embodiments. The example operations 400 may be performed in various embodiments by a spreadsheet application such as, for example, spreadsheet application 115 of FIG. 1, or one or more processors, extensions, modules, engines, components or tools associated therewith.

To begin, at 401, the spreadsheet application digests a schema to identify input and output parameters associated with the remote micro-service. As discussed herein, each schema can identify input and output parameters, and data types associated with a remote micro-service. The schema can be contained in a swagger document or some other document that is readable or otherwise decipherable by the spreadsheet application.

At 403, the spreadsheet application generates a mapping of the input and output parameters associated with the at least one remote micro-service to native parameters of the spreadsheet application. For example, the mapping can include identifying the native parameters that most closely relate to the micro-service parameters or quantizing particular parameters or groups of parameters. Lastly, at 405, the spreadsheet application creates the translation model based on the mapping.

Figure 5:
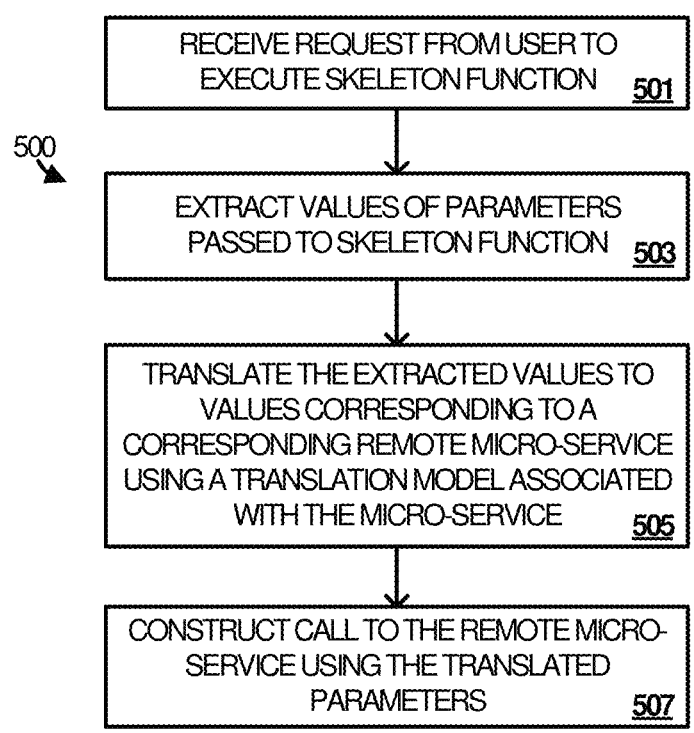
FIG. 5 depicts a flow diagram illustrating example operations of a spreadsheet application service for translating parameters passed to a skeleton spreadsheet function and constructing a call to a corresponding micro-service, according to some embodiments.

FIG. 5 depicts a flow diagram illustrating example operations 500 of a spreadsheet application service for translating parameters passed to a skeleton spreadsheet function and constructing a call to a corresponding micro-service, according to some embodiments. The example operations 500 may be performed in various embodiments by a spreadsheet application such as, for example, spreadsheet application 115 of FIG. 1, or one or more processors, extensions, modules, engines, components or tools associated therewith.

To begin, at 501, the spreadsheet application receives a request to execute a skeleton spreadsheet function. As discussed herein, skeleton spreadsheet functions can be presented or exposed to a user for use or execution thereof. In some instances, the user may not be aware that the skeleton spreadsheet function is a non-native function of the spreadsheet application. In other cases, one or more components of a user interface can graphically identify the skeleton spreadsheet function as a remote micro-service that is executable as a native function. Regardless, once exposed, the skeleton spreadsheet functions can be seamlessly executed by users of the spreadsheet application in the same manner as native functions of the spreadsheet application.

At 503, when a skeleton spreadsheet function corresponding to a remote micro-service is used or executed, the spreadsheet application extracts values of the parameters passed to the skeleton spreadsheet function, e.g., statically or dynamically, by the user or the spreadsheet application itself. At 505, the extracted values are translated to values corresponding to the remote micro-service. For example, values of extracted input parameters to the skeleton spreadsheet function are dynamically adjusted so that they are appropriate inputs to the remote micro-service. Lastly, at 507, the skeleton spreadsheet function constructs a call to the remote micro-service using the translated values corresponding to the remote micro-service.

Figure 6:
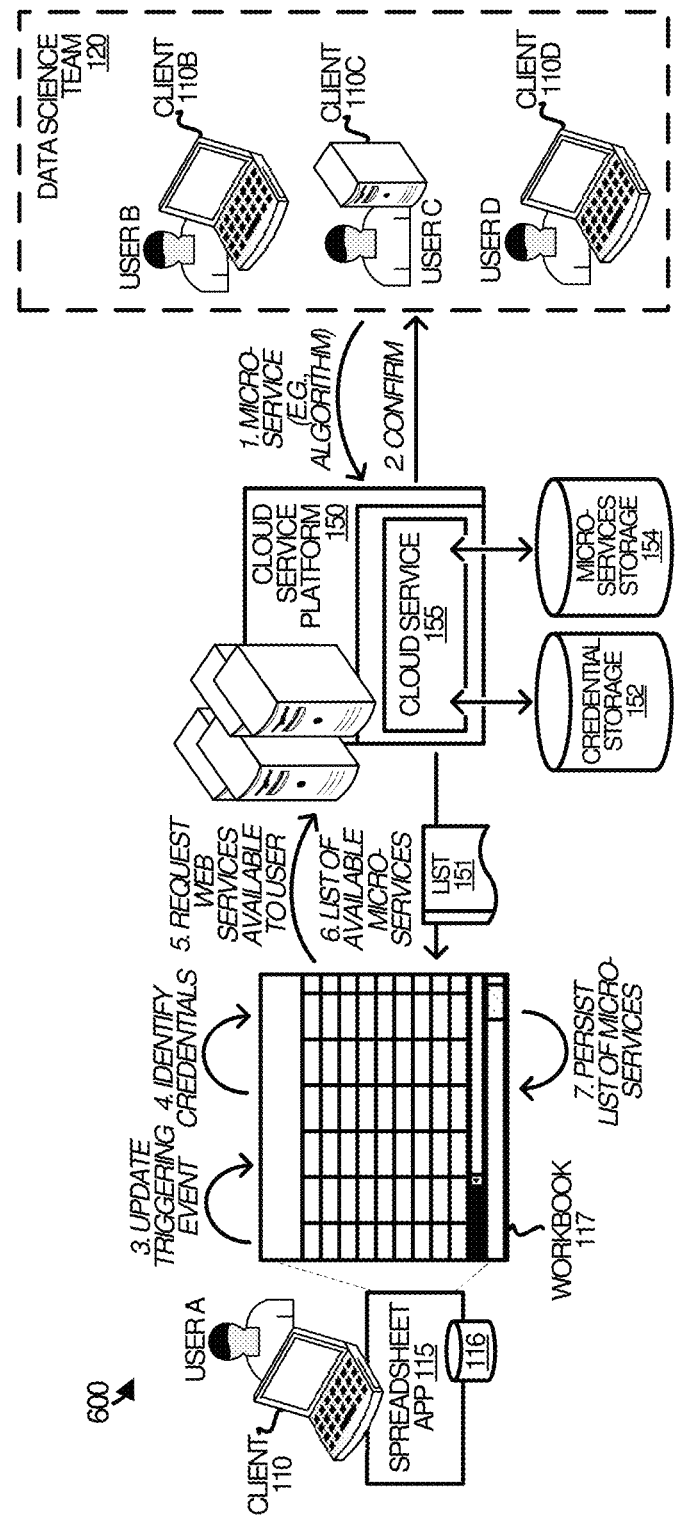
FIG. 6 depicts a block diagram illustrating an example operational architecture for proactively discovering micro-services that are available to a user of a spreadsheet application based on credential information, according to some embodiments.

FIG. 6 depicts a block diagram illustrating an example operational architecture 600 for proactively discovering micro-services that are available to a user of a spreadsheet application based on credential information, according to some embodiments. More specifically, the example of FIG. 6 illustrates obtaining a listing of micro-services that are available to a user of a spreadsheet application based on credential information. The example operational architecture 600 includes many of the same components as the example operational architecture 100 of FIG. 1, however, the example operational architecture 600 also includes a data science team 120. Alternative configurations including fewer or additional components are possible.

As shown in the example of FIG. 6, the data science team 120 includes member users B, C and D each operating a corresponding client system 110B, 110C, and 110D, respectively. It is appreciated that the data science team 120 can include any number of members, e.g., more or fewer than the three members shown in the example of FIG. 6.

In operation, a member of the data science team 120, e.g., user C, develops a data science model including at least one micro-service, e.g., web service or algorithm, on cloud service 155 operating on the cloud service platform 150 (step 1). As discussed herein, the member of the data science team creating the micro-service can also provide access rights for the micro-service. The access rights can be managed from the cloud service 155, e.g., the remote analytics platform. For example, a member of data science team 120 can grant or otherwise assign access rights based on user credentials to other users (other team and non-team members) including data analysists and other data scientists.

As shown in the example of FIG. 6, the member of the data science team 120, e.g., user C, that creates the micro-service can also provide access rights information granting user A, e.g., a data analyst, with access to the micro-service. In some embodiments, the cloud service 155 then provides a confirmation to the member of the data science team 120, e.g., user C, that the micro-service has been successfully created and persisted on cloud service platform 150 (step 2).

Once persisted, the micro-service can be proactively discovered by spreadsheet application 115 based on credential information associated with a user of the spreadsheet application 115, e.g., user A. Initially, the discovery process includes monitoring, by spreadsheet application 115, for occurrence of micro-service updating events (step 3). As discussed herein, the micro-service updating events can include, among others, launching of the spreadsheet application, an idle event, continuous operation of the spreadsheet application occurring for a threshold period, or by way of a manual intervention by the user of the spreadsheet.

Responsive to detecting a micro-service updating event, the spreadsheet application identifies credential information for providing to the cloud service 155 (step 4). As discussed herein, the credential information can be associated with a user of the spreadsheet application, e.g., user A, or, in some instances, the spreadsheet application itself. The spreadsheet application 115 then commences a proactive discovery of one or more micro-services that are available to the user of the spreadsheet application 115 through cloud service platform 150 based on the credential information. The discovery process can include requesting the micro-services that are available to user A (step 5). In some embodiments, spreadsheet application 115 first performs an authentication procedure using the credential information. For example, the authentication procedure can include sending a request for authentication and responsively receiving an access token. In some embodiments, the cloud service platform 150 performs the authentication; however, other authentication platforms or engines (not shown) are also possible.

Next, responsive to the request for micro-services available to the user, the cloud service 155 uses the credential information to identify the micro-services to which the user has access based on the credential information. The cloud service 155 generates list 151 containing the available micro-services and provides list 151 to spreadsheet application 115 (step 6). Lastly, the spreadsheet application persists list 151 in storage container 116 (step 7).

Figure 7:
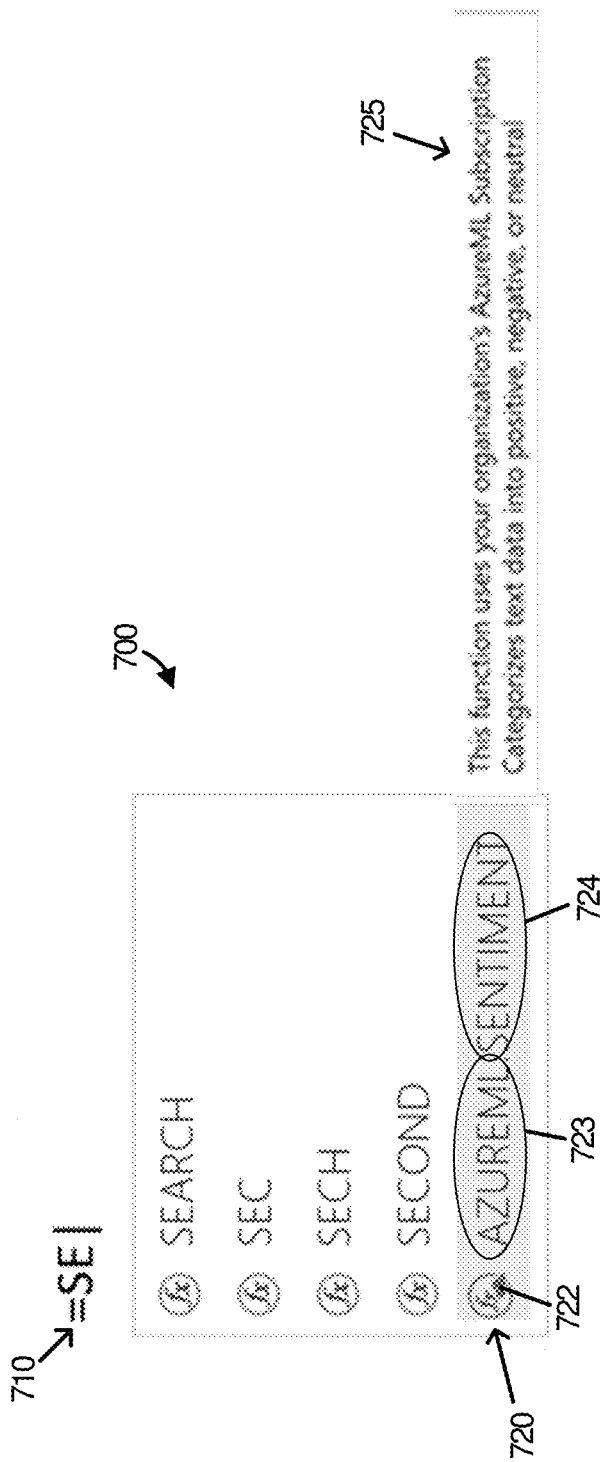
FIG. 7 depicts an example graphical user interface including an entry point for exposing remote micro-services as native functions of a spreadsheet application, according to some embodiments.
Figure 8B:
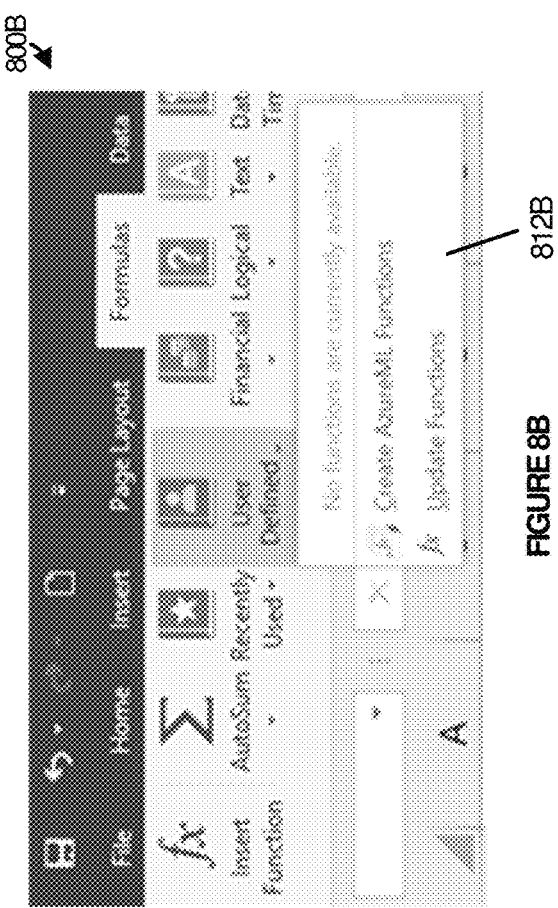
FIGS. 8A and 8B depict example graphical user interfaces including another entry point for exposing remote micro-services as native functions of a spreadsheet application, according to some embodiments.
Figure 8A:
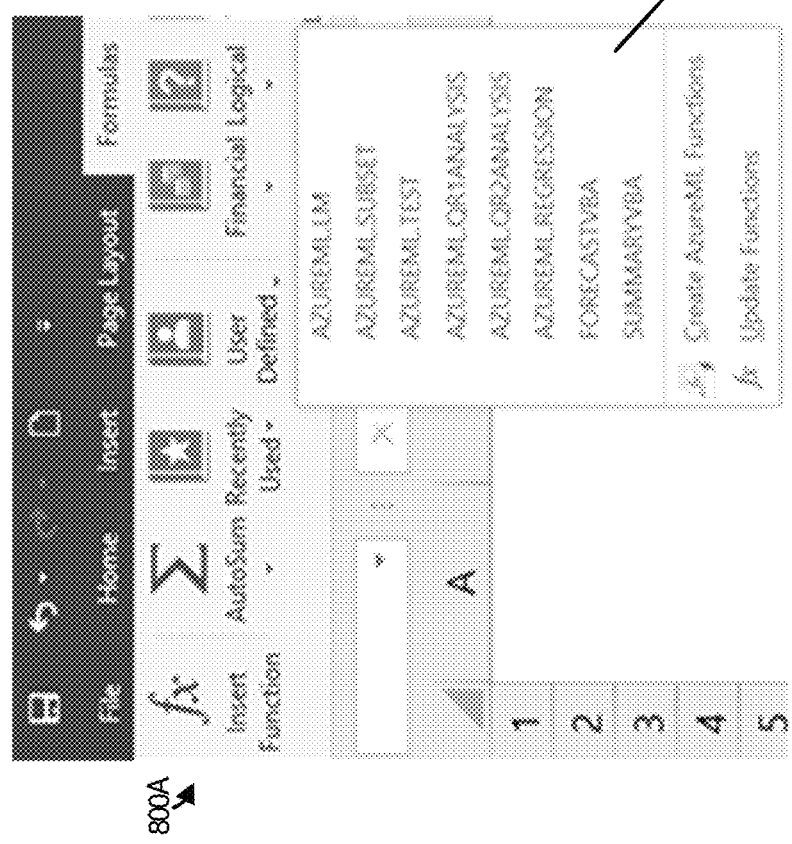
Figure 9:
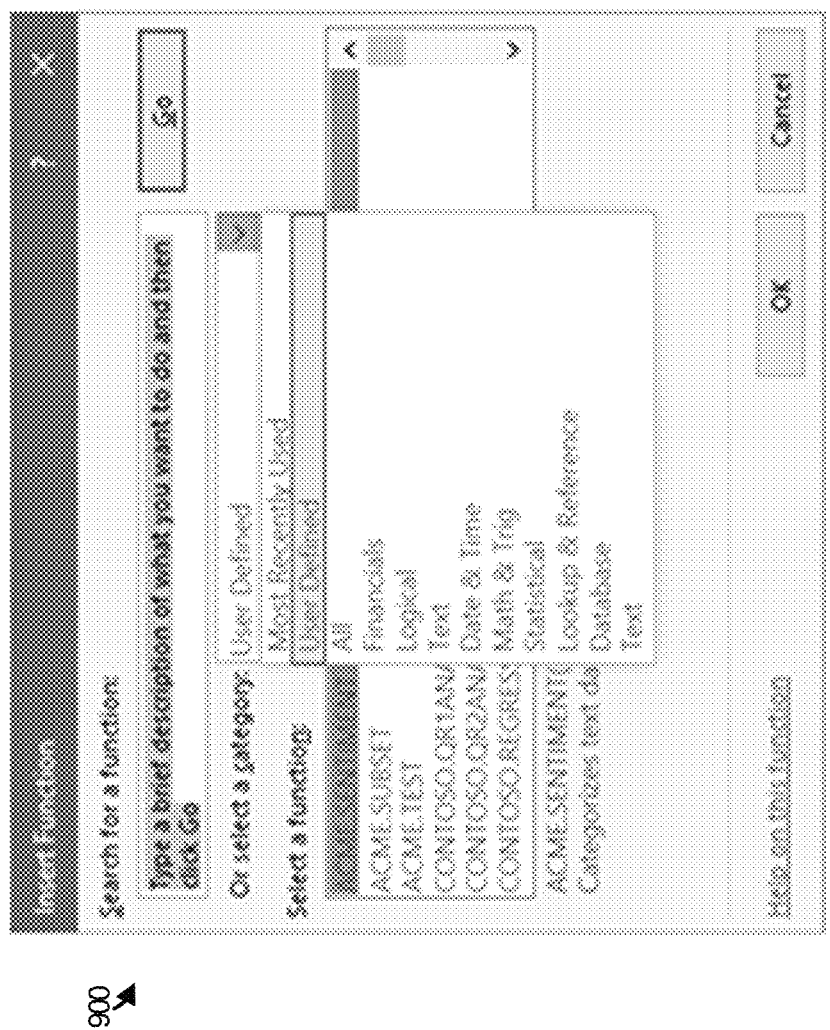
FIG. 9 depicts an example graphical user interface including another entry point for exposing remote micro-services as native functions of a spreadsheet application, according to some embodiments.

FIGS. 7-9 depict various example graphical user interfaces for exposing skeleton spreadsheet functions as native functions of a spreadsheet application, according to some embodiments. The graphical user interfaces shown in FIGS. 7-9 are generally self-explanatory, but are briefly discussed below.

Referring first to FIG. 7, FIG. 7 depicts an example graphical user interface 700 including an entry point for exposing remote micro-services as native functions, according to some embodiments. More specifically, the example of FIG. 7 depicts operations of autocomplete capabilities 710 of a spreadsheet application. For example, once a skeleton spreadsheet function 720, e.g., "AZUREML.SENTIMENT" is registered with the spreadsheet application, the function can automatically be presented or exposed to a user as part of the autocomplete capabilities 710 of the spreadsheet application. That is, registered skeleton spreadsheet functions follow the same autocomplete behavior as built-in functions—including search (e.g., typing "SE" can result in depicting AZUREML.SENTIMENT as a possible function as part of a drop-down menu).

In some embodiments, function icon 722 can be used to denote that the function is powered by remote services, e.g., cloud service platform 150 of FIG. 1. The function icon 722 can be, for example, a cloud, an online globe, etc., which indicates to a user that the spreadsheet function is in fact a skeleton spreadsheet function that calls a remote micro-service when invoked. The function icon 722 can alleviate potential privacy, compliance, and cost concerns related to using a service based function. As shown in the example of FIG. 7, the service portion 723 of the function can indicate or identify the remote service while the name portion 724 of the function can indicate the name of the remote function (or micro-service).

Additionally, in some embodiments when a remote service function is selected from the autocomplete list, the spreadsheet application can display a description of the function in a pop-up text box 725. The description can be provided by, for example, a data scientist to the remote service, e.g., cloud service 155, during generation of the micro-service.

Referring next to FIGS. 8A and 8B, FIGS. 8A and 8B depict example graphical user interfaces 800A and 800B, respectively, including another entry point for exposing remote micro-services as native functions. More specifically, the example FIGS. 8A and 8B depict operations of a new button referred to as "User Defined" that is added to a Formulas Tab of the spreadsheet application. The "User Defined" button is grouped in a new ribbon chunk with "AutoSum" and "Recently Used". When the "User Defined" button is exercised, a dropdown menu, e.g., 812A or 812B, is exposed illustrating various micro-services that are available for use by the user based on credential information.

As shown in the example of FIG. 8A, when a user of the spreadsheet application has provided valid credential information, e.g., a Managed Service Account (MSA)/Azure Active Directory (AAD) for an AzureML cloud service, the dropdown menu 812A exposes various micro-services that are available for use by the user. As discussed herein, these micro-services can be executed as native functions by the user. Various interactions are possible via the dropdown menu 812. For example, clicking on an item in the list can open the "FX Argument" dialog. Likewise, hovering over an item on the list can display the tooltip containing function description provided by a Data Scientist.

As shown in the example of FIG. 8B, when the user of the spreadsheet application has not provided valid credential information, e.g., a Managed Service Account (MSA)/Azure Active Directory (AAD) for an AzureML cloud service, the dropdown menu 812B does not expose any micro-services to the user as no services are available based on the credential information.

FIG. 9 depicts an example graphical user interface 900 including another entry point for exposing remote micro-services as native functions, according to some embodiments. More specifically, the example of FIG. 9 depicts operations of example insert function capabilities of a spreadsheet application. In some embodiments, the micro-services, e.g., AzureML functions, flow through the already existing "User Defined" category in the "Insert Function" dialog, however, other configurations are also possible.

FIG. 10 illustrates computing system 1001, which is representative of any system or collection of systems in which the various applications, services, scenarios, and processes disclosed herein may be implemented. For example, computing system 1001 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009. Processing system 1002 is operatively coupled with storage system 1003, communication interface system 1007, and an optional user interface system 1009.

Processing system 1002 loads and executes software 1005 from storage system 1003. When executed by processing system 1002 for deployment of scope-based certificates in multi-tenant remote content and collaboration environments, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device, but may also be distributed across multiple processing devices or sub-systems that cooperate in executing program instructions. Examples of processing system 1002 include general purpose central processing units, application specific processors, and logic devices, as well as any other type of processing device, combinations, or variations thereof.

Storage system 1003 may comprise any computer readable storage media readable by processing system 1002 and capable of storing the software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 1003 may also include computer readable communication media over which at least some of software 1005 may be communicated internally or externally. Storage system 1003 may be implemented as a single storage device, but may also be implemented across multiple storage devices or sub-systems co-located or distributed relative to each other. Storage system 1003 may comprise additional elements, such as a controller, capable of communicating with processing system 1002 or possibly other systems.

Software 1005 may be implemented in program instructions and among other functions may, when executed by processing system 1002, direct the processing system 1002 to operate as described with respect to the various operational scenarios, sequences, and processes illustrated herein. For example, software 1005 may include program instructions for directing the system to perform the processes described with reference to the Figures described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtual machine software, or application software. Software 1005 may also comprise firmware or some other form of machine-readable processing instructions executable by processing system 1002.

In general, software 1005 may, when loaded into processing system 1002 and executed, transform a suitable apparatus, system, or device (of which the computing system 1001 is representative) overall from a general-purpose computing system into a special-purpose computing system.

Indeed, encoding software on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1009 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1009. In some cases, the input and output devices may be combined in a single device, such as a display capable of displaying images and receiving touch gestures. The aforementioned user input and output devices are well known in the art and need not be discussed at length here. In some cases, the user interface system 1009 may be omitted when the computing system 1001 is implemented as one or more server computers such as, for example, blade servers, rack servers, or any other type of computing server system (or collection thereof).

User interface system 1009 may also include associated user interface software executable by processing system 1002 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Certain inventive aspects may be appreciated from the foregoing disclosure, of which the following are various examples.

Example 1

A method of operating a spreadsheet application to support remote micro-services as native functions, the method comprising accessing a listing identifying at least one micro-service remotely located in a cloud service platform that is available for use by a user of the spreadsheet application. The method further comprising obtaining a schema associated with the at least one micro-service and generating a translation model based on the schema. The translation model maps between the at least one micro-service and a skeleton spreadsheet function. The method further comprises registering the skeleton spreadsheet function as a native function in the spreadsheet application.

Example 2

The method of Example 1, wherein obtaining the schema comprises generating a request for the schema associated with the at least one micro-service, sending the request for delivery to the cloud service platform, and receiving the schema responsive to sending the request. The schema includes a description of the at least one micro-service.

Example 3

The method of Examples 1-2, wherein the listing identifies the at least one micro-service and a corresponding address for accessing the schema associated with the at least one micro-service.

Example 4

The method of Examples 1-3, wherein the description comprises a swagger document.

Example 5

The method of Examples 1-4, wherein generating the translation model comprises creating the skeleton spreadsheet function.

Example 6

The method of Examples 1-5, wherein generating the translation model comprises digesting the schema to identify input and output parameters associated with the at least one micro-service, generating a mapping of input and output parameters associated with the at least one micro-service to native parameters of the spreadsheet application, and creating the translation model based on the mapping of input and output parameters associated with the at least one micro-service.

Example 7

The method of Examples 1-6, wherein generating the mapping of input and output parameters associated with the at least one micro-service further comprises identifying data types of the input and output parameters associated with the at least one micro-service, and mapping the data types associated with the input and output parameters to native data types of the spreadsheet application.

Example 8

The method of Examples 1-7, further comprising exposing the skeleton spreadsheet function through a user interface as a native function of the spreadsheet application.

Example 9

The method of Examples 1-8, wherein exposing the skeleton spreadsheet function to the user further comprises presenting the at least one micro-service to the user through the user interface at an entry point.

Example 10

The method of Examples 1-9, wherein the entry point comprises one or more of an autocomplete function, a ribbon, or an insert function.

Example 11

The method of Examples 1-10, wherein a component of the user interface graphically identifies the skeleton spreadsheet function as a micro-service.

Example 12

The method of Examples 1-11, further comprising receiving a request to execute the skeleton spreadsheet function, extracting values of parameters passed to the skeleton spreadsheet function, translating the values of the parameters passed to the skeleton spreadsheet function to values corresponding to the at least one micro-service using the translation model, and constructing a call to the at least one micro-service using the translated values corresponding to the at least one micro-service.

Example 13

A method of supporting remote micro-services as native functions within a spreadsheet application, the method comprising requesting, from a cloud service, a schema for each of one or remote more micro-services that are available for use by a user of the spreadsheet application based on credential information associated with the user, and generating a translation model for each of the one or more remote micro-services based on a corresponding schema, where each translation model maps between one of the one or more remote micro-services and a skeleton spreadsheet function. The method further comprising registering each skeleton spreadsheet function as a native function of the spreadsheet application.

Example 14

The method of Example 13, wherein generating the translation model for each of the one or more remote micro-services based on the corresponding schema comprises digesting each schema to identify input and output parameters associated with a corresponding micro-service, generating a mapping of the input and output parameters associated with the corresponding micro-service to native parameters of the spreadsheet application, and creating the translation model for each corresponding micro-service based on the mapping.

Example 15

The method of Examples 13-14, wherein generating the mapping further comprises identifying data types of the input and output parameters associated with each of the one or more remote micro-services, and mapping the data types associated with the input and output parameters to native data types of the spreadsheet application.

Example 16

The of Examples 13-15, further comprising exposing the skeleton spreadsheet function through a user interface as a native function of the spreadsheet application.

Example 17

An apparatus comprising one or more computer readable storage media and program instructions stored on the one or more computer readable storage media. When executed by a processing system, the program instructions direct the processing system to at least access a listing identifying at least one micro-service remotely located in a cloud service platform that is available for use by a user of a spreadsheet application, obtain a schema associated with the at least one micro-service, generate a translation model based on the schema, wherein the translation model provides a mapping between the at least one micro-service and a skeleton spreadsheet function, and register the skeleton spreadsheet function as a native function in the spreadsheet application.

Example 18

The apparatus of claim 17, wherein to generate the translation model based on the schema, the program instructions, when executed by the processing system, further direct the processing system to digest the schema to identify input and output parameters associated with the at least one micro-service, generate a mapping of the input and output parameters associated with the at least one micro-service to native parameters of the spreadsheet application, and create the translation model based on the mapping.

Example 19

The apparatus of claims 17-18, wherein to generate the mapping, the program instructions, when executed by the processing system, further direct the processing system to identify data types of the input and output parameters associated with the at least one micro-service, and map the data types of the input and output parameters associated with the at least one micro-service to native data types of the spreadsheet application.

Example 20

The apparatus of claims 17-19, wherein the program instructions, when executed by the processing system, further direct the processing system to expose the skeleton spreadsheet function through a user interface as a native function of the spreadsheet application.

What is claimed is:

1. A device-implemented method of operating a spreadsheet application to support remote micro-services as native functions, the method comprising:
    accessing a listing identifying a micro-service that is remotely located in a cloud service platform and available for use by a user of the spreadsheet application;
    obtaining a schema associated with the micro-service, wherein the schema includes a description of the micro-service;
    generating a translation model based on the schema, wherein generating the translation model comprises:
        identifying input and output parameters of the micro-service; and
        quantizing the input and output parameters of the micro-service to native parameters of the spreadsheet application that most closely relate to the input and output parameters of the micro-service;
        wherein the translation model provides a mapping between the input and output parameters of the micro-service and a skeleton spreadsheet function that uses the quantized native parameters of the spreadsheet application as input and output parameters; and
    registering the skeleton spreadsheet function as a native function of the spreadsheet application.

2. The device-implemented method of claim 1, wherein obtaining the schema comprises:
    generating a request for the schema associated with the micro-service;
    sending the request for delivery to the cloud service platform; and
    responsively receiving the schema.

3. The device-implemented method of claim 2, wherein the listing identifies the micro-service and a corresponding address for accessing the schema associated with the micro-service.

4. The device-implemented method of claim 2, wherein the description comprises a swagger document.

5. The device-implemented method of claim 1, wherein generating the translation model further comprises creating the skeleton spreadsheet function.

6. The device-implemented method of claim 1, wherein generating the translation model further comprises:
    digesting the schema to identify the input and output parameters associated with the micro-service;
    generating a mapping of the input and output parameters associated with the micro-service to the native parameters of the spreadsheet application; and
    creating the translation model based on the mapping of the input and output parameters associated with the micro-service.

7. The device-implemented method of claim 6, wherein generating the mapping of the input and output parameters associated with the micro-service further comprises:
    identifying data types of the input and output parameters associated with the micro-service; and
    mapping the data types associated with the input and output parameters to native data types of the spreadsheet application.

8. The device-implemented method of claim 1, further comprising:
    exposing the skeleton spreadsheet function through a user interface as a native function of the spreadsheet application.

9. The device-implemented method of claim 8, wherein exposing the skeleton spreadsheet function to the user further comprises presenting the micro-service to the user through the user interface at an entry point.

10. The device-implemented method of claim 9, wherein the entry point comprises one or more of an autocomplete function, a ribbon, or an insert function.

11. The device-implemented method of claim 9, wherein a component of the user interface graphically identifies the skeleton spreadsheet function as a micro-service.

12. The device-implemented method of claim 1, further comprising:
    receiving a request to execute the skeleton spreadsheet function;
    extracting values of parameters passed to the skeleton spreadsheet function;
    translating the values of the parameters passed to the skeleton spreadsheet function to values corresponding to the micro-service using the translation model; and
    constructing a call to the micro-service using the translated values corresponding to the micro-service.

13. A device-implemented method of supporting remote micro-services as native functions within a spreadsheet application, the method comprising:
    requesting, from a cloud service, a schema for each of one or more remote micro-services that are available for use by a user of the spreadsheet application based on credential information associated with the user;
    generating a translation model for each of the one or more remote micro-services based on a corresponding schema,
        wherein generating the translation model comprises:
            identifying input and output parameters of the one or more remote micro-services; and quantizing the input and output parameters to native parameters of the spreadsheet application that most closely relate to the input and output parameters;

wherein each translation model provides a mapping between the input and output parameters of the one or more remote micro-services and a skeleton spreadsheet function that uses the quantized native parameters of the spreadsheet application as input and output parameters; and registering each skeleton spreadsheet function as a native function of the spreadsheet application.

14. The device-implemented method of claim 13, wherein generating the translation model for each of the one or more remote micro-services based on the corresponding schema comprises:

digesting each schema to identify input and output parameters associated with a corresponding micro-service;

generating a mapping of the input and output parameters associated with the corresponding micro-service to native parameters of the spreadsheet application; and creating the translation model for each corresponding micro-service based on the mapping.

15. The device-implemented method of claim 14, wherein generating the mapping further comprises:

identifying data types of the input and output parameters associated with each of the one or more remote micro-services; and mapping the data types associated with the input and output parameters to native data types of the spreadsheet application.

16. The device-implemented method of claim 13, further comprising:

exposing the skeleton spreadsheet function through a user interface as a native function of the spreadsheet application.

17. An apparatus comprising:

one or more computer readable storage media; and program instructions stored on the one or more computer readable storage media which, when executed by a processing system, direct the processing system to at least:

access a listing identifying micro-service remotely located in a cloud service platform that is available for use by a user of a spreadsheet application;

obtain a schema associated with the micro-service;

generate, based on the schema, a translation model by quantizing input and output parameters associated with the micro-service to native parameters of the spreadsheet application that most closely relate to the input and output parameters of the micro-service, wherein the translation model provides a mapping between the input and output parameters of the micro-service and a skeleton spreadsheet function that uses the quantized native parameters of the spreadsheet application as input and output parameters; and register the skeleton spreadsheet function as a native function in the spreadsheet application.

18. The apparatus of claim 17, wherein to generate the translation model based on the schema, the program instructions, when executed by the processing system, further direct the processing system to:

digest the schema to identify the input and output parameters associated with the micro-service; and generate a mapping of the input and output parameters associated with the micro-service to the native parameters of the spreadsheet application.

19. The apparatus of claim 18, wherein to generate the mapping, the program instructions, when executed by the processing system, further direct the processing system to:

identify data types of the input and output parameters associated with the micro-service; and map the data types of the input and output parameters associated with the micro-service to native data types of the spreadsheet application.

20. The apparatus of claim 17, wherein the program instructions, when executed by the processing system, further direct the processing system to:

expose the skeleton spreadsheet function through a user interface as a native function of the spreadsheet application.

* * * * *